United States Patent
Choi

(10) Patent No.: US 9,053,282 B2
(45) Date of Patent: Jun. 9, 2015

(54) MESH PLANES WITH ALTERNATING SPACES FOR MULTI-LAYERED CERAMIC PACKAGES

(71) Applicant: Jinwoo Choi, Austin, TX (US)

(72) Inventor: Jinwoo Choi, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/288,692

(22) Filed: May 28, 2014

(65) Prior Publication Data

US 2014/0282346 A1 Sep. 18, 2014

Related U.S. Application Data

(62) Division of application No. 13/305,482, filed on Nov. 28, 2011, now Pat. No. 8,791,371.

(51) Int. Cl.

| G06F 17/50 | (2006.01) |
|---|---|
| H01L 23/498 | (2006.01) |
| H05K 1/02 | (2006.01) |
| H01L 23/15 | (2006.01) |
| H05K 3/46 | (2006.01) |
| H01L 23/50 | (2006.01) |

(52) U.S. Cl.
CPC ...... *G06F 17/5077* (2013.01); *H01L 23/49822* (2013.01); *H01L 23/49827* (2013.01); *H05K 1/0224* (2013.01); *H05K 2201/09681* (2013.01); *H05K 3/4629* (2013.01); *H01L 23/15* (2013.01); *H01L 23/50* (2013.01); *H01L 2924/0002* (2013.01); *H05K 1/0225* (2013.01); *G06F 2217/82* (2013.01)

(58) Field of Classification Search
USPC .......................................................... 716/115
See application file for complete search history.

(56) References Cited

U.S. PATENT DOCUMENTS

| 5,633,479 | A | 5/1997 | Herano |
|---|---|---|---|
| 6,184,477 | B1 | 2/2001 | Tanahashi |
| 6,255,600 | B1 | 7/2001 | Schaper |
| 6,297,460 | B1 | 10/2001 | Schaper |
| 6,657,130 | B2 | 12/2003 | Van Dyke |

(Continued)

FOREIGN PATENT DOCUMENTS

WO WO2011/067053 A1 6/2011

OTHER PUBLICATIONS

Edeg,Bertalan et. al."Reduction of far end cross-talk in coupled microchip PCB interconnect" manuscript for IEEE Instrument Technology Conference (seeAbstract and conclusion.

*Primary Examiner* — Suresh Memula
(74) *Attorney, Agent, or Firm* — Joscelyn Cockburn

(57) ABSTRACT

An improved multi-layered ceramic package includes a plurality of signal planes, each having one or more signal lines; a plurality of vias, each providing one of a voltage (Vdd) power connection or a ground (Gnd) connection; and at least one reference mesh plane adjacent to one or more signal planes. The reference mesh plane includes spaced mesh lines that are separated by spaces that alternate in a narrow-wide or wide-narrow pattern. A multi-layered ceramic package, using the mesh plane with alternating spaces, generates significantly lower far-end (FE) noise in the ceramic package than a conventional mesh plane with constant spaces. The noise is further reduced by placing shield lines on opposite sides of signal lines in the signal plane. A method, computer system, and program code that generate the design for the multi-layered ceramic package are also disclosed.

18 Claims, 15 Drawing Sheets

(56) References Cited

U.S. PATENT DOCUMENTS

| | | |
|---|---|---|
| 6,677,831 B1 | 1/2004 | Cheng |
| 6,800,939 B2 | 10/2004 | Schaper |
| 7,348,667 B2 | 3/2008 | Chun et al. |
| 7,473,854 B2 | 1/2009 | Honjo |
| 7,929,147 B1 | 4/2011 | Fong et al. |
| 2006/0214190 A1 | 9/2006 | Chun et al. |
| 2008/0270968 A1* | 10/2008 | Bartley et al. ............... 716/15 |
| 2011/0061898 A1* | 3/2011 | Mutnury et al. ............ 174/250 |
| 2011/0083888 A1 | 4/2011 | Choi et al. |
| 2011/0132650 A1 | 6/2011 | Becker et al. |
| 2011/0169150 A1 | 7/2011 | Su et al. |
| 2012/0125677 A1* | 5/2012 | Choi et al. ................. 174/262 |
| 2012/0204141 A1* | 8/2012 | Choi et al. ................. 716/127 |
| 2013/0252379 A1* | 9/2013 | Becker et al. ............. 438/121 |

* cited by examiner

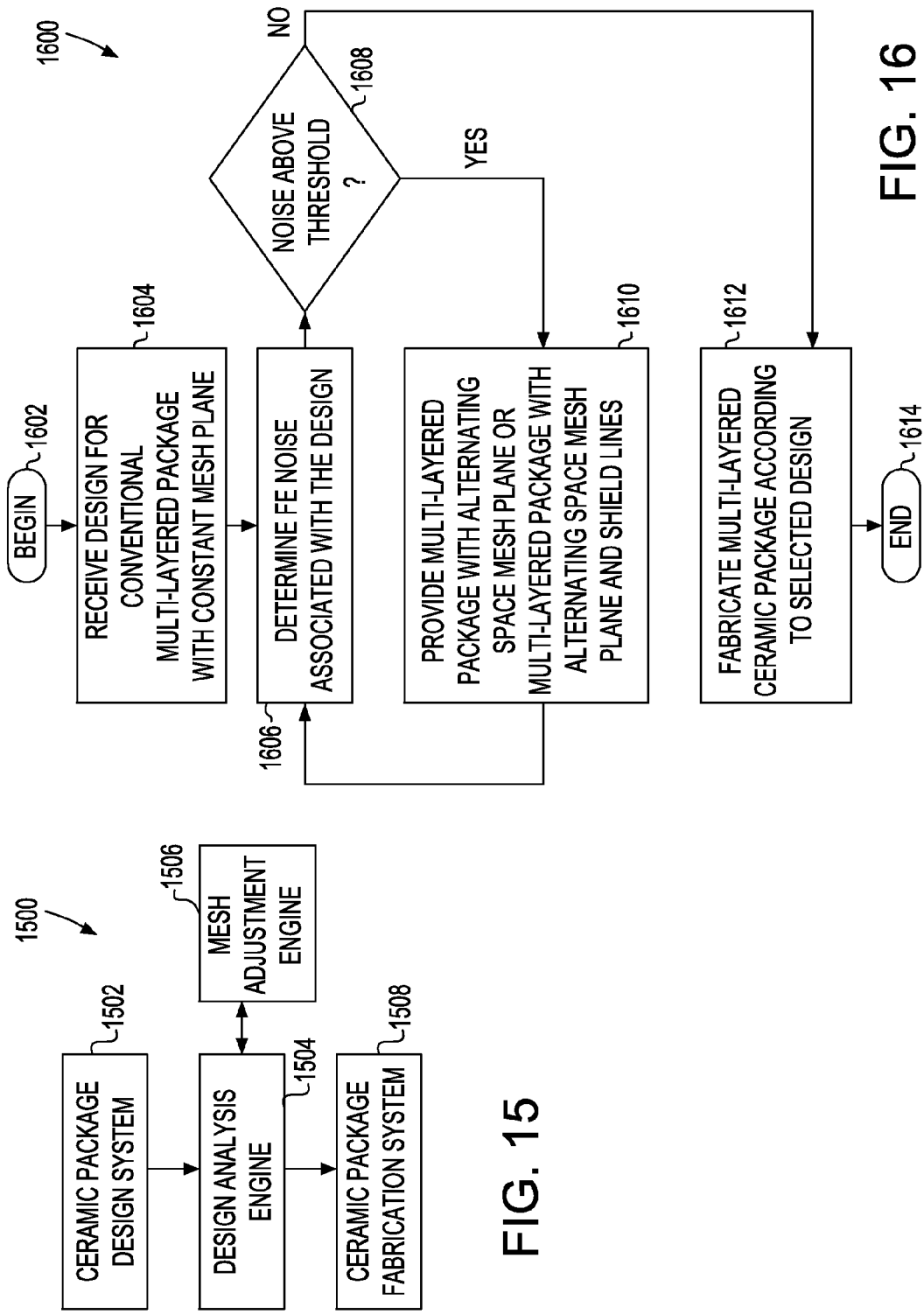

MESH PLANES WITH ALTERNATING SPACES FOR MULTI-LAYERED CERAMIC PACKAGES

CROSS-REFERENCE TO RELATED PATENT APPLICATION

This application, a divisional of U.S. patent application Ser. No. 13/305,482 filed on Nov. 28, 2011, claims priority and all benefits to which the application Ser. No. 13/305,482 is entitled.

BACKGROUND

The present invention relates to integrated circuits, and more specifically, to multi-layered ceramic packages. The packages are usually used for mounting or supporting semiconductor chips or modules. A typical semiconductor chip includes miniaturized semiconductor devices formed on a semiconductor substrate. The semiconductor substrate, such as silicon, is usually brittle, and relies on the carrier, on which it is mounted, for support and mechanical rigidity. In addition, to providing support, the carrier provides a mechanical and an electrical interfaces between the chip and the device, such as a printed circuit board (PCB) or the like, on which the chip/carrier combination is mounted. The combination is termed a "chip carrier" or "chip package", which can be a single-chip module (SCM) or multi-chip modules (MCM).

A multi-layered ceramic package is attractive for interfacing SCM or MCM to a Printed Circuit Board (PCB) or the like; because it can provide very high wiring and power densities. The densities are hallmarks of an efficient and high performance system. A conventional ceramic package is usually formed from a plurality of signal planes carrying electrical conductors, and sandwich between a plurality of reference planes. Each signal plane is placed between upper and lower reference planes, which provide supply (Vdd) and ground (gnd) potential to the signal plane. Each reference plane is, usually, a grid structure, which is formed from intersecting reference lines accessible by vias. The grid structure may be fabricated on a ceramic substrate.

To meet performance requirements, imposed by high performance systems, there has been a steady increase in the number of signal lines and signal speed provided in a chip package. As the speed and number of signal lines increase, the potential for cross-talk between signal lines in the same layer, and signal lines in adjacent layers, also, increase. The cross-talk results in the creation of electrical noise, which adversely affects the signaling rates and performance in a chip package.

SUMMARY

According to one embodiment of the present invention, an improved multi-layered ceramic package is provided. The package includes a plurality of signal planes, each having one or more signal lines; a plurality of vias, each providing one of a voltage (Vdd) power connection or a ground (Gnd) connection; and at least one reference mesh plane adjacent, and parallel to one or more signal planes also known as signal layers. The reference mesh plane includes a plurality of intersecting reference lines, separated in one direction with alternating relatively narrow and relatively wide spaces in the plane of the reference mesh layer. In one exemplary embodiment, the spaces are in a two-to-one ratio, and a one-to-two ratio. Stated another way, if the relatively narrow space is represented by N units; then the relatively wide space would be represented by 2N units, and N representing a desired unit of measurement. In another exemplatory example, the alternating spaces in the reference mesh plane are displaced or positioned in the direction of signal propagation in the signal plane. The novel mesh plane, with alternating narrow/wide or wide/narrow spaces, significantly reduces Far-End (FE) noise coupling between signal lines within the multi-layered ceramic package. The FE noise level can further be reduced by fabricating shield lines on opposite sides of a signal line in the signal plane.

The multi-layered package with the novel reference layer or plane can be developed from a method implemented by a program product executed on a computer. The program product includes computer usable program code embedded in a computer usable medium.

Another embodiment of the invention provides a system which designs and fabricates the multi-layered ceramic package with the novel reference mesh layer. The system includes a multi-layered package design engine configured to generate a multi-layered ceramic package that includes a signal plane having a plurality of signal lines, and a mesh reference plane having a plurality of intersecting reference lines positioned parallel to the signal plane. A mesh optimization engine is configured to adjust the placement of the reference lines; so the spaces associated with the adjusted reference lines alternate in a two to one (2:1) ratio. A ceramic package fabrication system fabricates the multi-layered ceramic package based on the design, including the novel reference plane.

BRIEF DESCRIPTION OF THE SEVERAL VIEWS OF THE DRAWINGS

FIG. 15 is an alternate exemplary block diagram of a system for designing, and fabricating the multi-layered ceramic package.

FIG. 16 is a flow chart of a method to design the reference mash plane with alternating spaces alone or with alternating spaces, and shield lines in the signal plane.

DESCRIPTION

Figure 1:
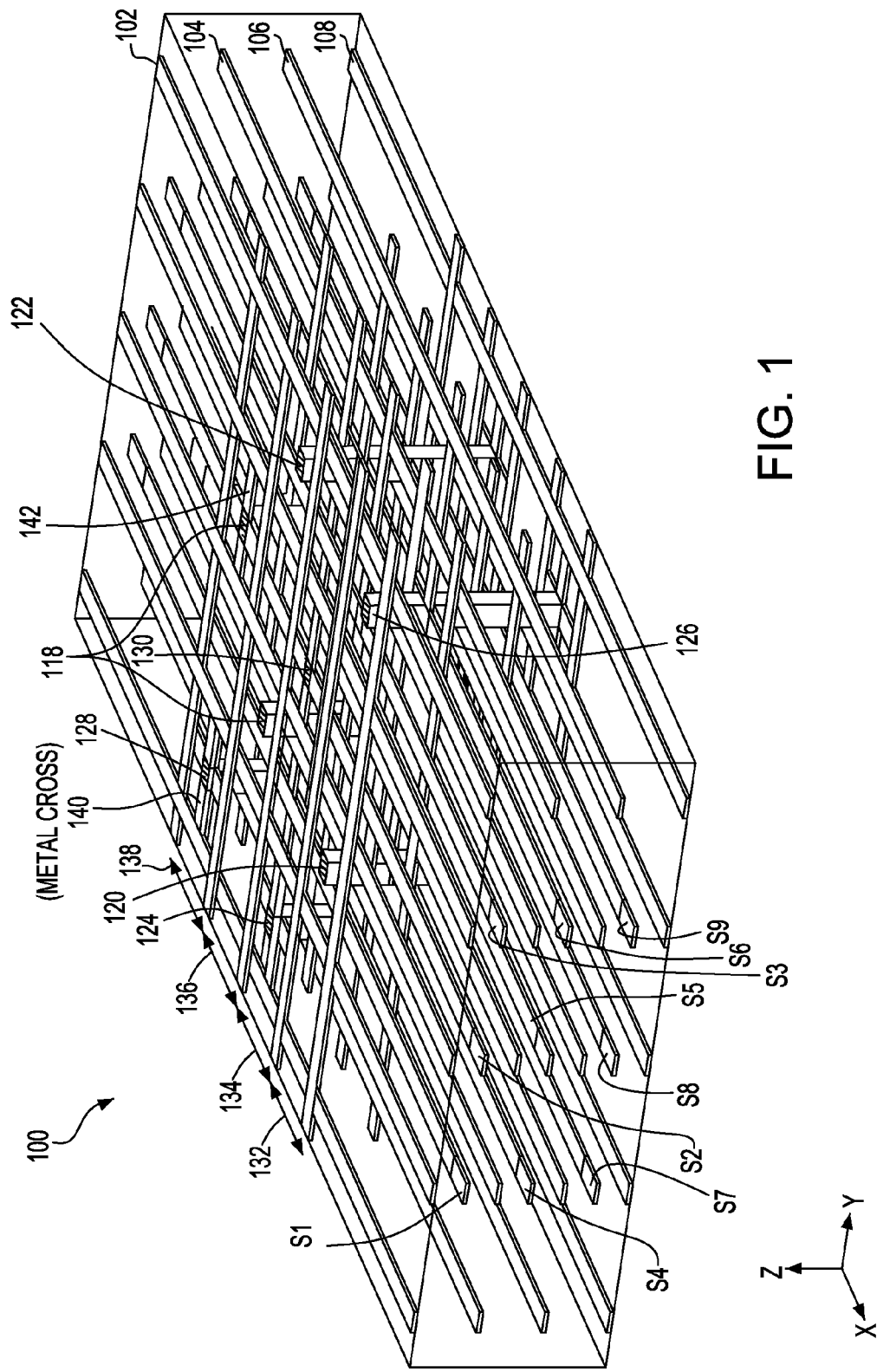
FIG. 1 is a perspective three dimensional (3D) view of a multi-layered ceramic package with constant spaces between reference lines of the reference mesh plane.

With reference now to FIG. 1, there is depicted a conventional model/design of a three dimensional (3D) multi-layered ceramic package 100. As shown, the multi-layered ceramic package 100 comprises four reference mesh planes/layers 102, 104, 106, and 108; a plurality of signal (trace) layers (three shown) with signal lines S1-S9 interspersed between the reference mesh planes/layers 102, 104, 106, and 108; and a plurality of vias (some are shown and labeled 118, 120, 122, 124, 126, 128 and 130) extending through the reference mesh planes/layers 102, 104, 106, and 108. The reference mesh planes/layers are identical. Therefore, the description of one is intended to cover the description of all. Each of the reference mesh planes includes a ceramic substrate on which a plurality of reference mesh lines are deposited and inter connected to form a lattice structure. As shown in FIG. 1 (more clearly in FIG. 2), the lattice structure includes a first set of spaced reference lines extending in a direction parallel to the Y-axis of an X-Y plane; and a second set of spaced reference lines extends in the X-direction of the X-Y plane. Selected ones of the first set and the second set are connected by metal cross structures. Two of the metal cross structures, labeled 140 and 142, are shown in FIG. 1.

Still referring to FIG. 1, the reference mesh planes or layers are arranged in a stacked configuration, and displaced relative to one another. Each of the reference mesh planes provides either Vdd (above gnd) potential or ground (gnd) potential. As a consequence, each of the reference mesh planes is provided with appropriate connection, not shown, to accept or receive Vdd or gnd potential, as the case may be, from external supply sources. The arrangement of the reference mesh planes in the stack is such that they alternate based on polarity. For example, a reference mesh plane providing gnd. potential is followed by one providing Vdd potential, followed by another one providing gnd potential and so forth. The vias are arranged to be in contact with selected ground or above ground reference mesh planes, respectively, and distribute ground and above ground potential throughout the multi-layered ceramic package. Signal propagation is in the X-direction. Spaces 132, 134, 136, and 138, between mesh lines, are constant or identical. Notably, with the conventional multi-layered ceramic package of FIG. 1 issues of coupling noise/cross talk between adjacent signal nets, and resonance within the ceramic package are common, though undesirable. By redesigning the reference mesh planes in accordance with an embodiment of the invention, set forth herein, the undesirable characteristics, such as noise, of the ceramic package are eliminated or significantly reduced.

Figure 2:
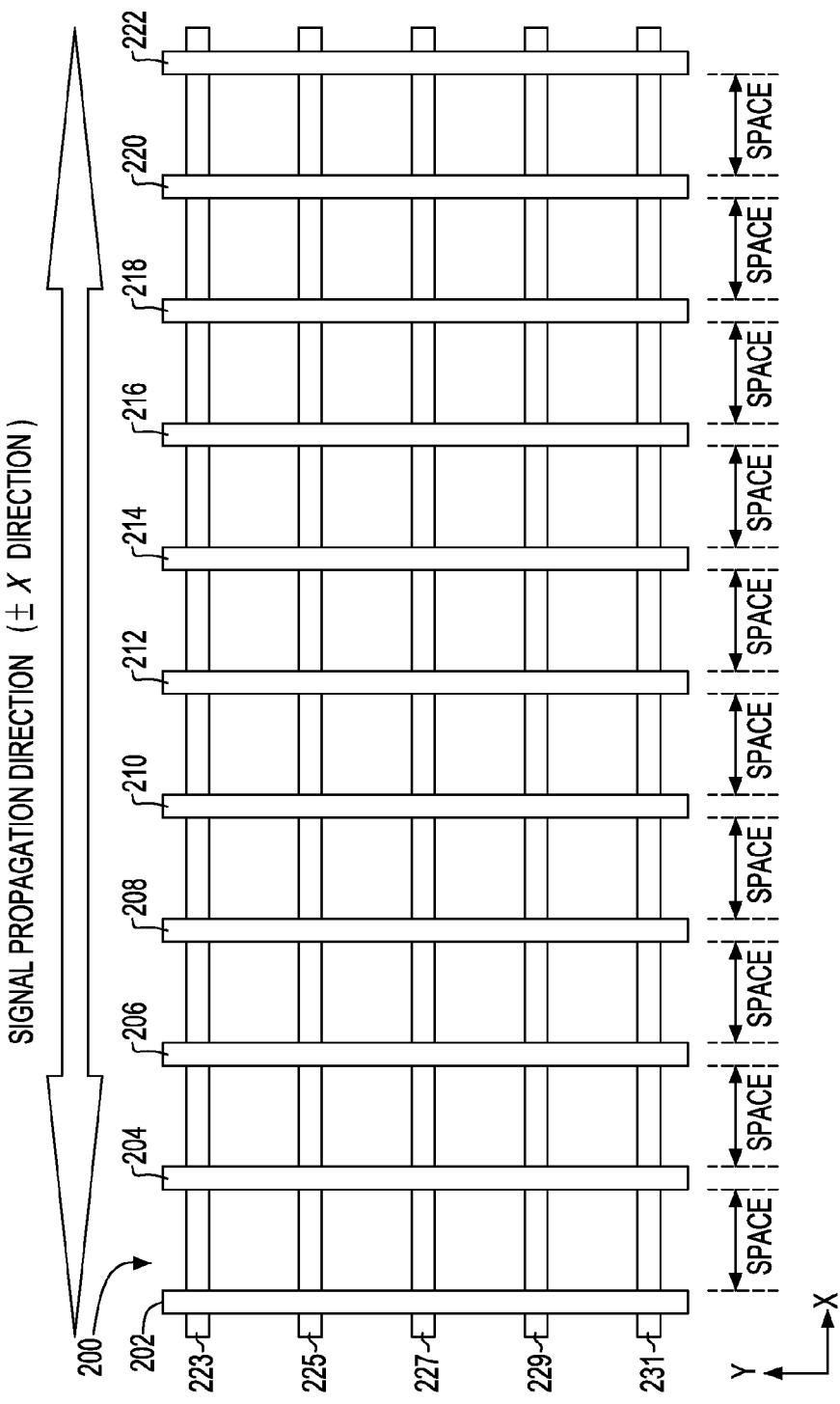
FIG. 2 is a schematic of a partial top plan view of the reference mesh plane depicting constant spaces between reference lines, and the direction of signal propagation in the signal plane.

FIG. 2 is a schematic plane view (facing XY plane) of a conventional reference mesh plane 200 which is identical to the reference mesh planes 102-108 of FIG. 1. Mesh plane 200 comprises a first set of mesh lines 202-222 extending in the X direction of the XY plane. A second set of mesh lines 223-231 extends in the Y direction of the XY plane. The first set and the second set of mesh lines are interconnected to form a unified mesh. The signal propagation, for this configuration, is in the X direction (positive and negative) of the XY plane. The spaces between the first set of lines are identical or constant.

Figure 3:
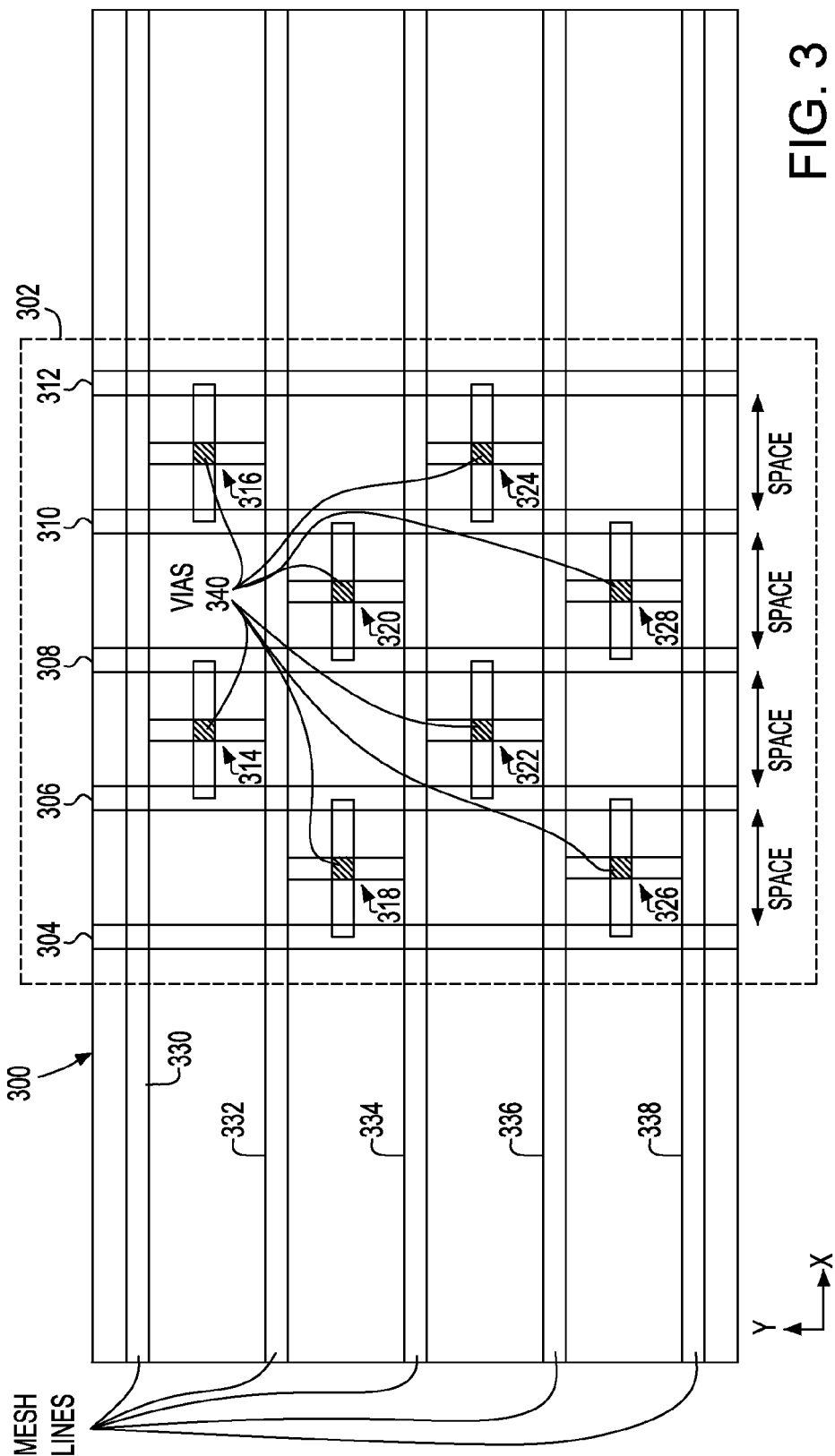
FIG. 3 is a schematic of a full or complete top plan view of the reference plane with constant space.

FIG. 3 is a schematic top view (bird eye view) 300 of the multi-layered ceramic package of FIG. 1. The view demonstrates the conventional mesh layer with constant spaces. Broken lines 302 enclose the detailed section of the view. The enclosed section shows mesh lines 304-312 and 330-338 interconnected by metal crosses 314-328. The metal crosses provide rigidity and mechanical strength to the mesh structure, connect gnd. vias to gnd. planes, and connect vdd vias to vdd planes. Vias 340 are also shown in the view. The signal lines transmit signals; whereas the vias provide proper potential to the planes in multi-layered ceramic packages. For example, gnd vias are used to connect gnd planes; and vdd vias are used to connect vdd planes. By so doing, all gnd planes have the same gnd potential by gnd vias; and all vdd planes have the same vdd potential by vdd vias. As is shown, the spaces between mesh lines are the same or constant.

Figure 4:
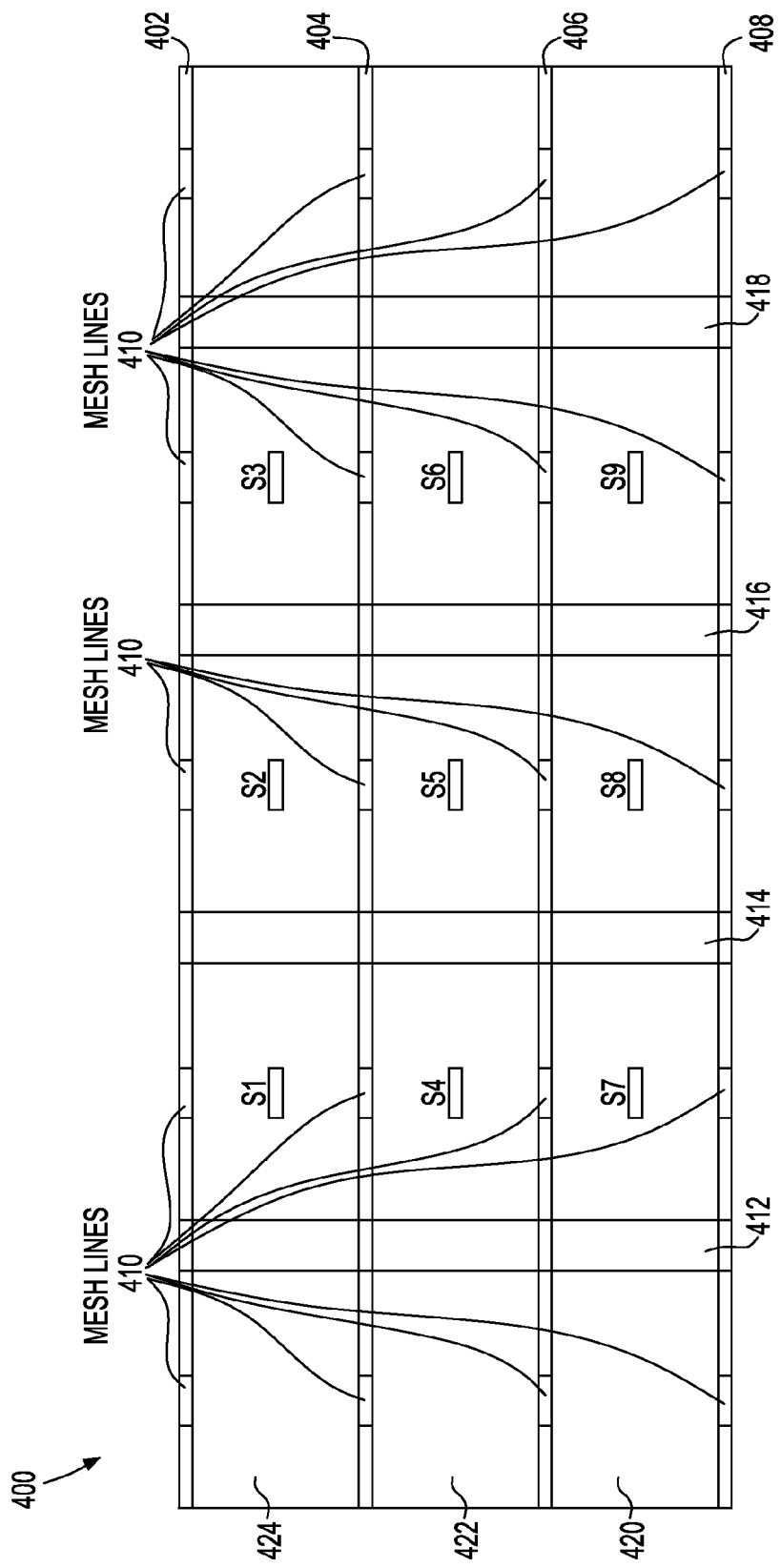
FIG. 4 is a schematic cross-sectional view of the 3D multi-layered ceramic package depicted in FIG. 1.

FIG. 4 depicts a cross-sectional view of the conventional multi-layered ceramic package, including the conventional reference mesh planes with constant spaces between mesh lines. The cross-sectional view 400 provides mesh planes 402, 404, 406, and 408. A plurality of mesh lines 410 are connected to respective ones of the mesh planes. The spaces in the conventional mesh planes are constant or identical. Vias 412, 414, 416, and 418 interconnect the mesh planes 408-402. Signal layers, also referred to as signal planes, 420, 422, and 424 are interspersed between the mesh planes. Signal lines S7, S8, and S9 are fabricated in signal layer 420; signal lines S4, S5, and S6 are fabricated in signal layer 422; while signal lines S1, S2, and S3 are fabricated in signal layer 424. As will be explained in greater detail below, signal line S5, due to its location in the middle of the structure, experience maximum noise caused by cross talk resulting from signal transmission on the other signal lines. For purposes of discussion and measurement of noise activity within the conventional multi-layered ceramic package, S5 is termed "victim signal line"; whereas, the other lines that cause or inflict the noise are termed "aggressor signal lines". As a result of its susceptibility to noise, the conventional multi-layered ceramic package, such as the one shown in FIG. 1, is relegated to devices operating at relatively low transmission rate. These devices are referred to as low end devices. In contrast, an embodiment of the invention, set forth below, eliminates or significantly reduces noise in the associated multi-layered package. As a consequence, it can be used in devices operating at relatively high transmission rates (termed high end device); and the devices that operate at relatively low transmission rate (termed low end devices). Stated another way, the embodiment of the present invention is suitable for use in low end and high end devices.

Figure 5:
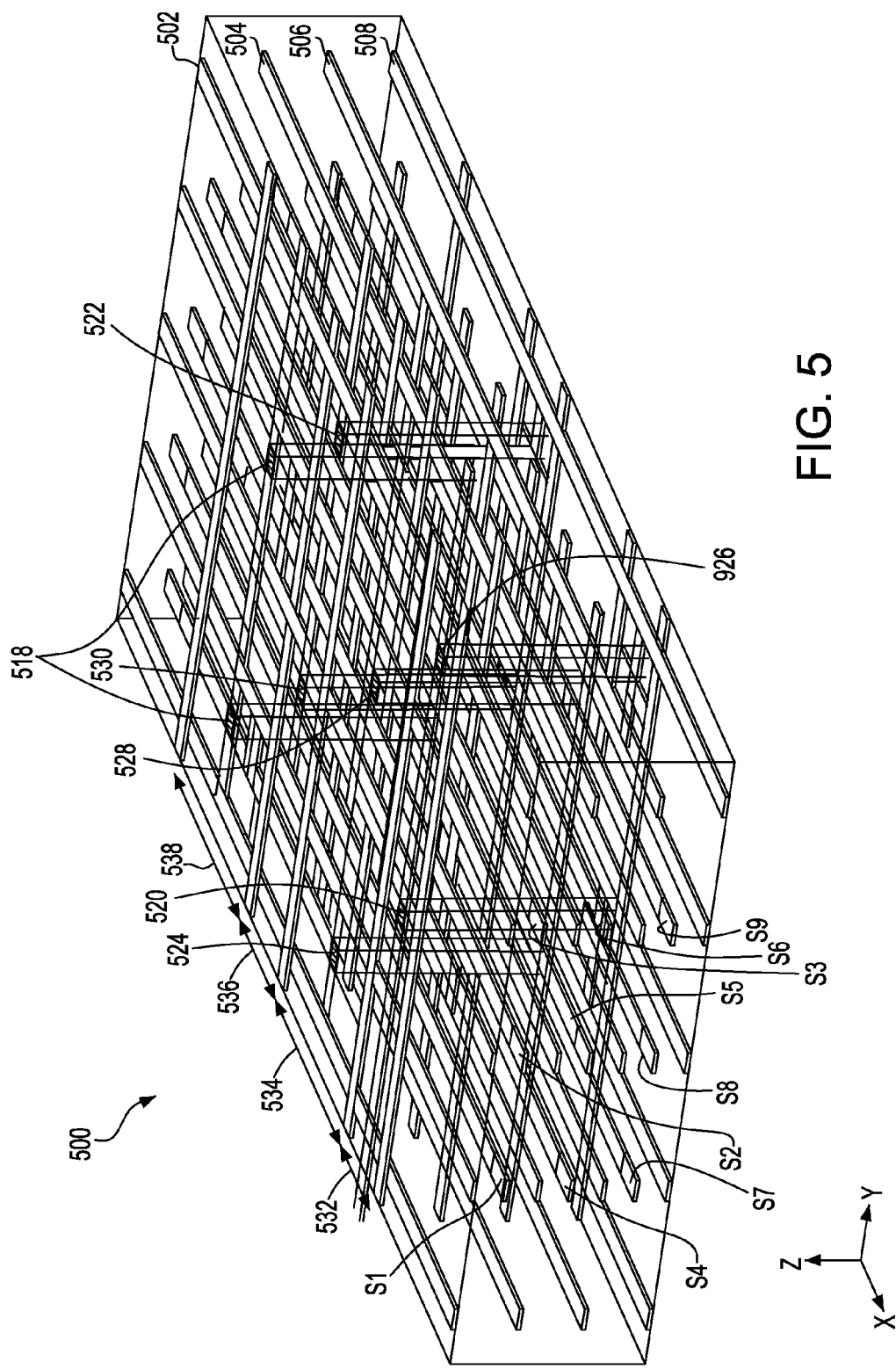
FIG. 5 is a schematic perspective 3D view of a multi-layered ceramic package with the novel reference mesh plane according to one embodiment of the present invention.

Referring now to FIG. 5, there is shown an exemplary schematic of a 3D view multi-layered ceramic package 500 designed and manufactured according to an embodiment of the invention. Except for the novel structure of the reference mesh plane or mesh layer of FIG. 5, the remaining structure is substantially the same as the structure in FIG. 1. In this document, "plane" and "layer" are used interchangeably. Stated another way, "layer" and "plane" are synonymous. The multi-layered package 500 comprises four reference mesh layers 502-508, a plurality of signal layers interspersed between the mesh layers, nine signal lines S1-S9, a plurality of vias 518-530 extending from lowest reference mesh layer 508 through the intermediate mesh layers to the uppermost mesh layer 502. Each of the mesh planes is formed from a plurality of interconnected intersecting mesh lines, some of which extend parallel to the X axis of the XY plane, and others extend parallel to the Y axis of the XY plane. The signal layers, carrying signal lines S1-S9 respectively, are positioned in parallel relative to the reference mesh layers. Notably, the multi-layered ceramic package of FIG. 5 includes a novel reference mesh layer structure that eliminates or significantly reduces interferences, such as Far End (FE) noise within the ceramic package. This makes it attractive for use in high performance (high end) devices as well as low performance (low end) devices. The reference mesh plane may be fabricated by screening conductors on individual ceramic sheets or substrates that are laminated and sintered at higher than 900 degrees centigrade. Likewise, the reference mesh layer of the disclosed embodiment could be fabricated by other known processes.

Still referring to FIG. 5, signal transmission in signal lines S1-S9 is in the positive and negative X direction of the XY plane. This should not be construed as a limitation on the scope or teachings of the disclosed embodiment; since it is within the skill of one skilled in the art to change the orientation of the multi-layered ceramic package so that signal transmission is in another direction. It is the intention of the applicant that any such changes are covered by the appended claims. The spaces between the mesh lines in the direction of current flow alternate between Space 1 identified by numerals 532 and 536, and Space 11 identified by numerals 534 and 538; wherein Space 1 and Space 11 are of different dimensions. Stated another way, if Space 1 represents N units of measurement, then, Space 11 would represent 2N units of measurement or any other ratio selected by the designer. Likewise, if Space 11 is M units of measurement; then Space 1 would be M divided by two units. The units of measurement could be a designer's choice. As will be demonstrated herein after, a multi-layered ceramic package using the novel reference mesh layer eliminates or significantly reduces Far-End (FE) noise. For this demonstration, S5 is the "victim" signal line; whereas S1-S4 and S6-S9 are the aggressor signal lines.

Figure 6:
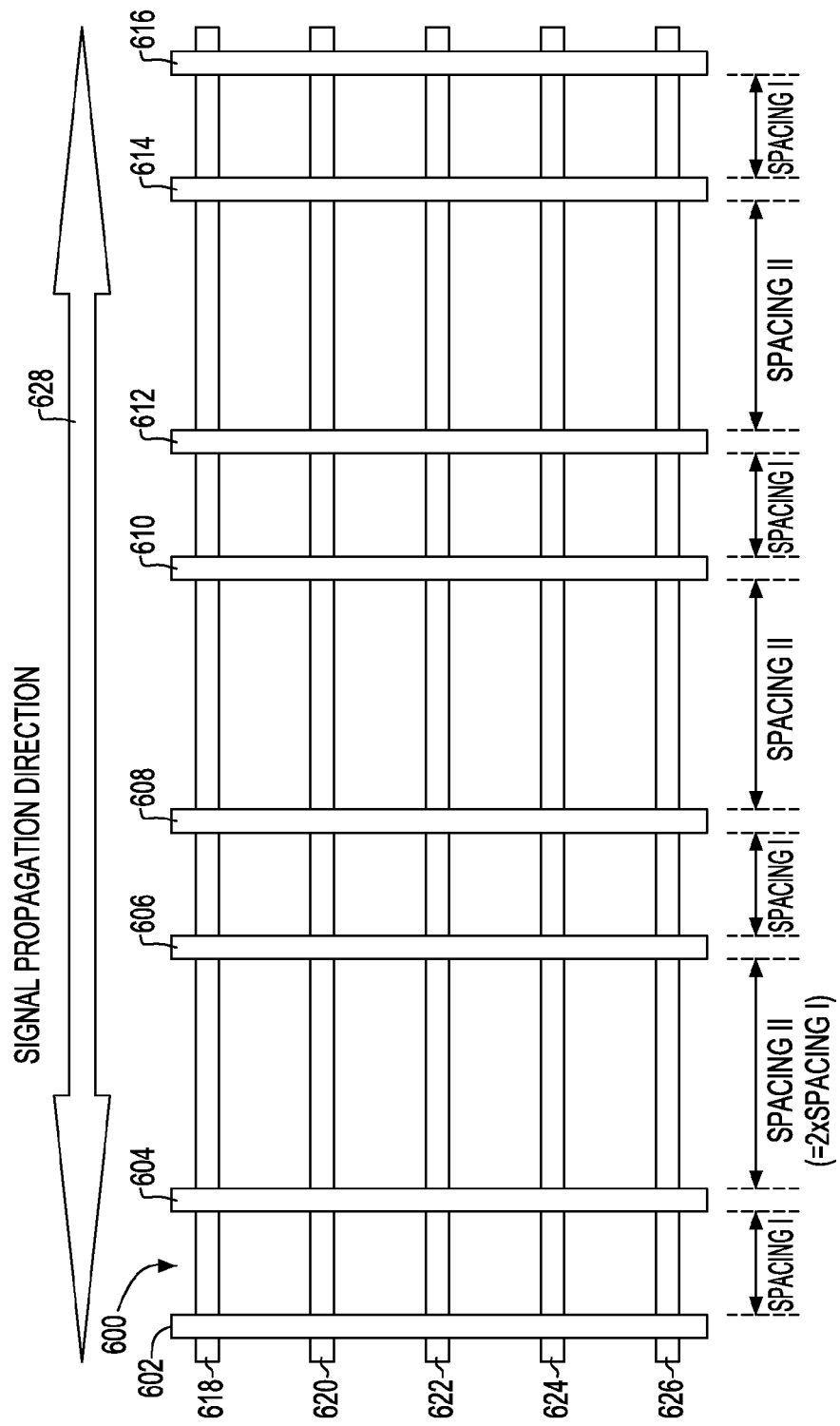
FIG. 6 is a schematic of a partial top plan view of the novel reference mesh plane, shown in FIG. 5, depicting the alternating spacing scheme and the direction of signal propagation in the signal plane.

Referring now to FIG. 6, there is shown a schematic of a partial top plan view (bird eye view) of the novel reference mesh plane 600 used in FIG. 5. The view demonstrates the alternate spacing scheme used in the reference mesh plane 600. Mesh plane 600 includes a first set of mesh lines 602-616 interconnected to a second set of orthogonal mesh lines 618-626. The double-headed arrow 628, for the structure shown, represents the direction of signal propagation along the positive and negative direction of the X-axis in the XY plane. It should be noted that other directions of signal propagation may be selected without deviating from the scope and teachings of this disclosure. Notably, in the novel reference mesh layer 600 spaces that are labeled Spacing 1 and Spacing 11 between the first set of mesh lines 602-616 varies in an alternate pattern, in the direction of signal propagation shown by double headed arrow 628. The relation between Spacing 1 and Spacing 11 is such that Spacing 11 equals 2 Spacing 1. It should be noted that other ratios between Spacing 1 and Spacing 11 may be selected without departing from the spirit and teachings of the embodiment.

Figure 7:
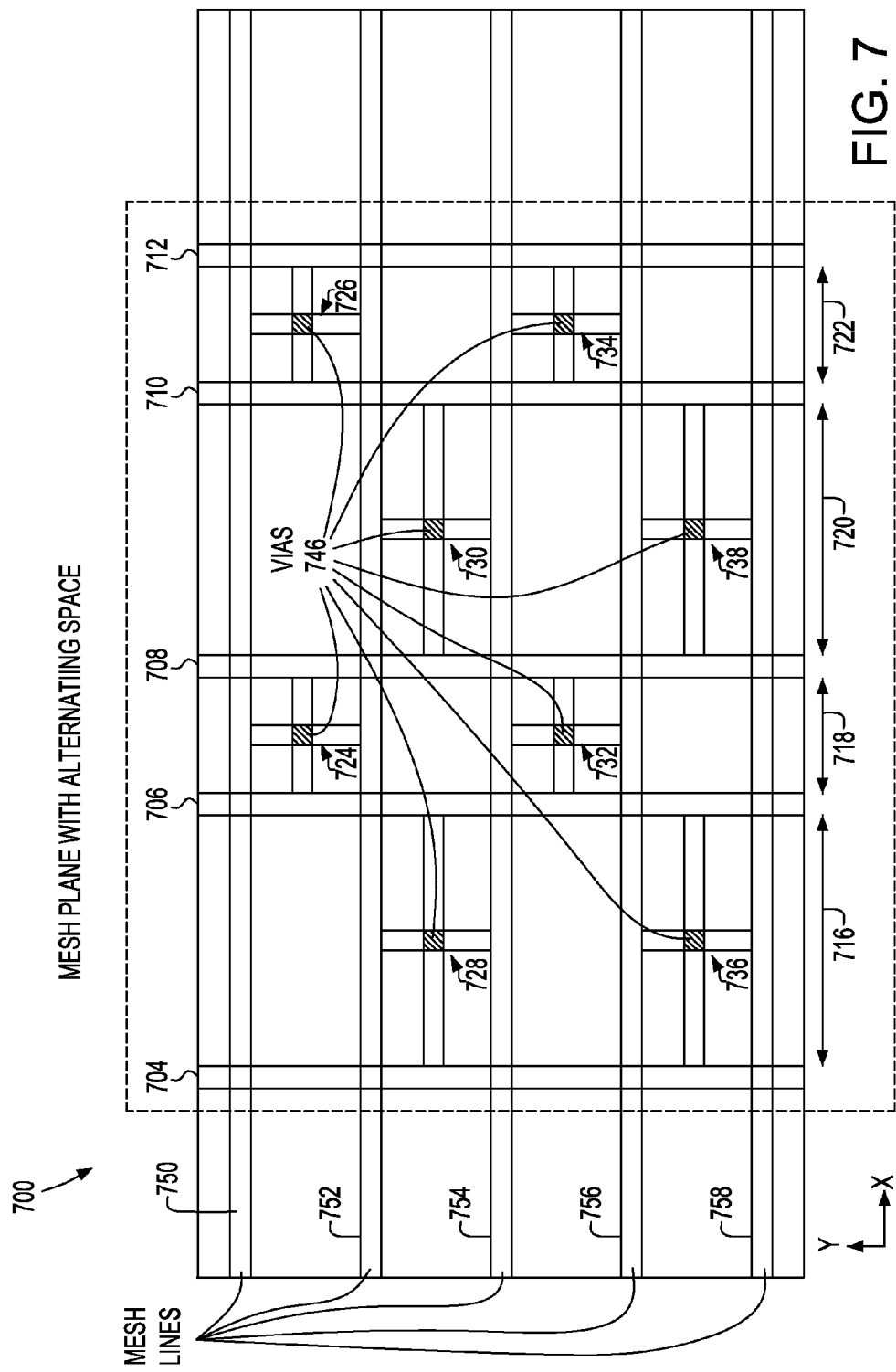
FIG. 7 is a schematic of a full top plan view of the novel reference mesh plane, shown in FIG. 5, depicting the alternate spacing scheme according to an embodiment of the invention.

Referring now to FIG. 7, there is shown a schematic of the top plan view of the multi-layered ceramic package of FIG. 5. The top plan view 700 depicts a novel mesh plane comprising mesh lines 704-712 and alternating Spaces 716, 718, 720, and 722. The enclosed section shows mesh lines 704-712, and 750-758 interconnected by metal crosses 724-738. Metal crosses 724-738 hold the mesh lines together. In addition, a plurality of vias 746 is shown. Each one, of vias 746, is associated with respective ones of the metal crosses, and provides either gnd potential or Vdd (above gnd potential) thereto.

Figure 8:
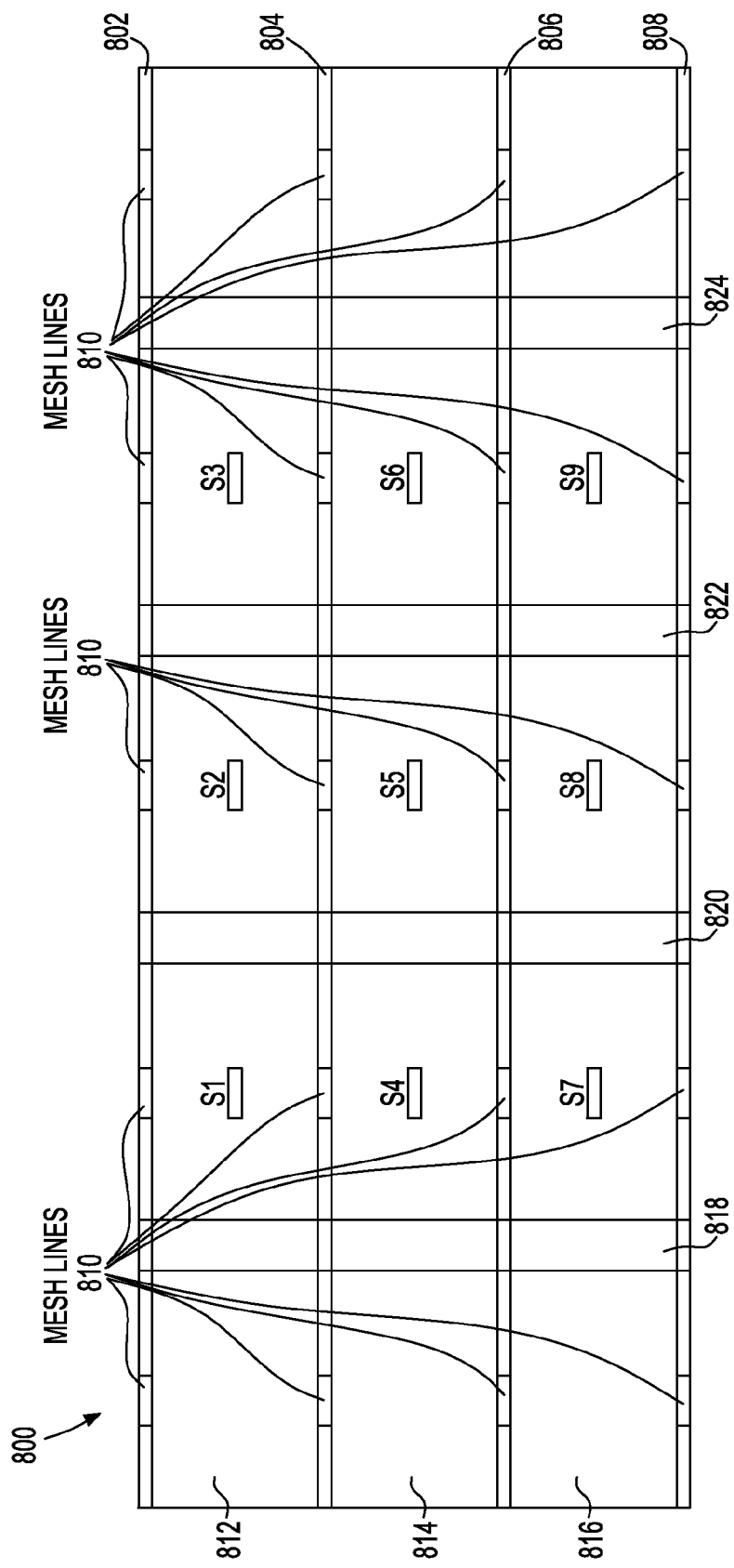
FIG. 8 is a schematic cross-sectional view of the 3D multi-layered ceramic package with the novel reference mesh plane structure depicted in FIG. 5.

Referring now to FIG. 8, there is depicted a schematic of the cross-sectional view of the exemplary multi-layered ceramic package of FIG. 5. The view demonstrates the mesh plane structure with alternating spaces. The cross-sectional view 800 comprises reference mesh layers 802-808 with mesh lines 810. Signal planes 812, 814, and 816 are interspersed between the mesh planes. Signal lines S7, S8, and S9 are fabricated in signal layer 816; signal lines S4, S5, and S6 are fabricated in signal layer 814; whereas signal lines S1, S2, and S3 are fabricated in signal layer 812. Vias 818, 820, 822, and 824 interconnect mesh layers 808, 806, 804, and 802.

Figure 9:
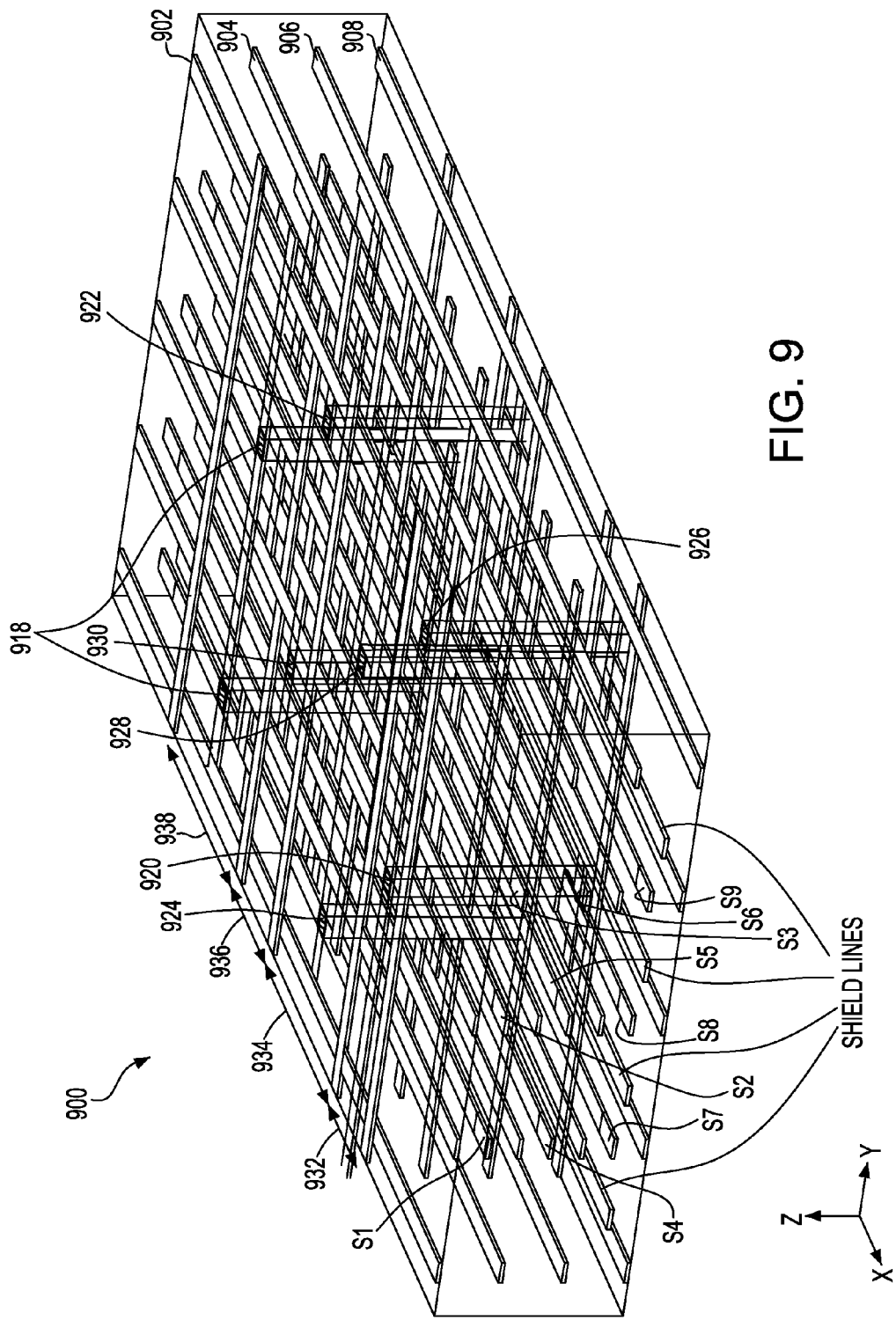
FIG. 9 is a schematic perspective 3D view of a multi-layered ceramic package depicting a reference mesh plane with alternating spaces, and shield lines in the signal plane.

FIG. 9 is a schematic of a three dimensional view of the multi-layered ceramic package having the reference mesh plane with alternating spaces and shield lines in the signal propagating layer. The ceramic package, inclusive of shield lines in the signal plane and alternating spaces in the mesh plane, further reduces Far-End (FE) noise in the multi-layered structure. Except for the shield lines, the 3D ceramic structure of FIG. 9 is substantially the same as the 3D ceramic structure of FIG. 5. Also, except for the novel mesh plane with alternating spaces and shield lines in the signal planes, the 3D ceramic structure of FIG. 9 is substantially identical to the structure in FIG. 1. The 3D ceramic structure 900 comprises four mesh planes 902, 904, 906, and 908; a plurality of signal planes interspersed and run parallel to the mesh planes; a plurality of vias extend from the lowest mesh plane 908 through the intermediate mesh planes 906 and 904 to the uppermost mesh plane 902; signal lines S1-S9 fabricated on the plurality of signal planes; and shield lines disposed on opposite sides of a signal line. For this embodiment, the spaces 932, 934, 936, and 938, between mesh lines, alternate in a 2:1 (two to one) ratio in the X direction of the XY plane. It should be noted that other ratios may be chosen without deviating from the teachings of the embodiment. For this embodiment, signal flow is in the X direction (positive and negative) of the XY plane. It should be noted that it is within the skill of one skilled in the art to provide other orientation of a structure in which signal flow in another direction; such a structure would still be covered by the teachings of the disclosure. The shield lines extend parallel to the signal lines, and on opposite sides.

Figure 10:
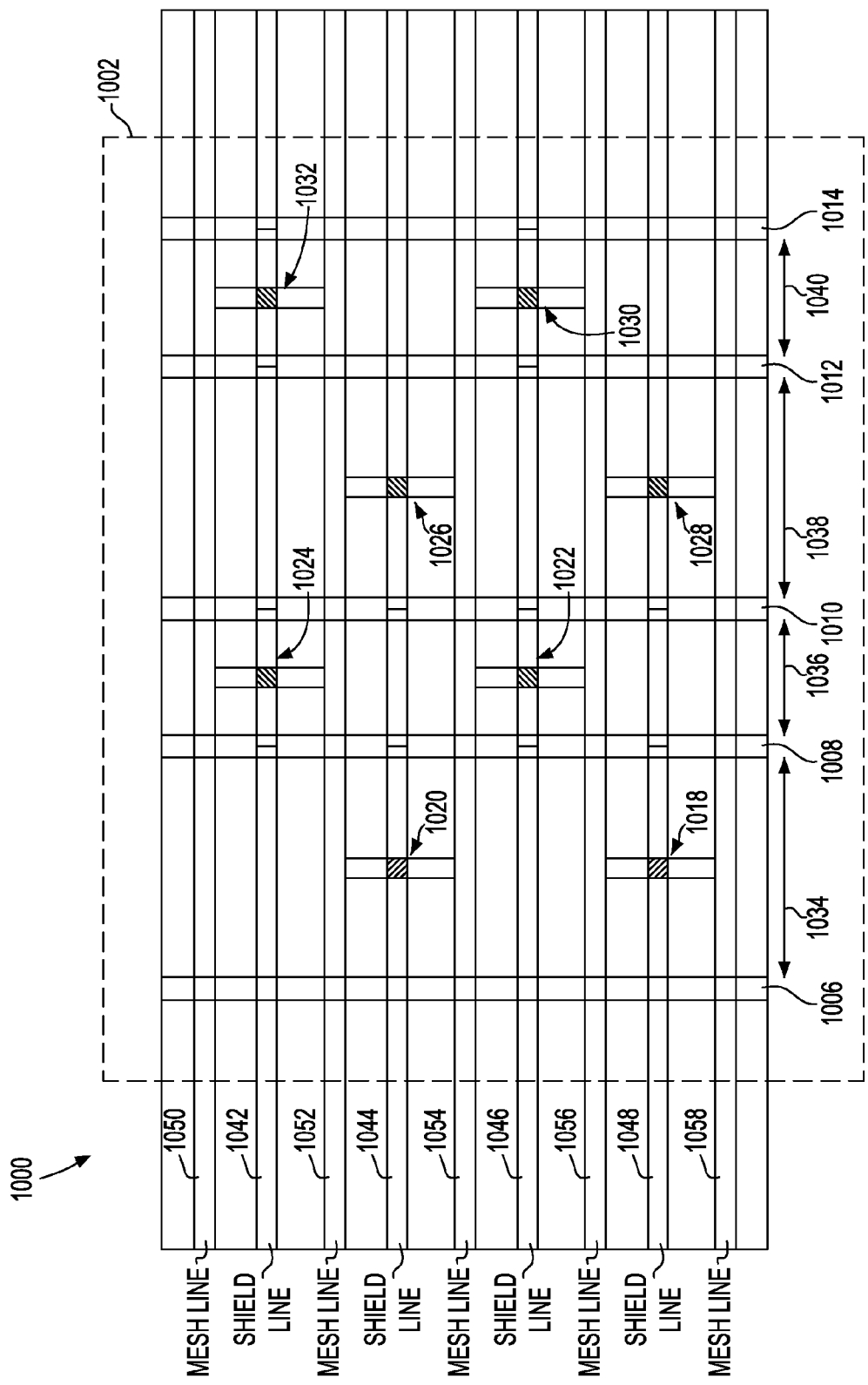
FIG. 10 is a schematic of the top plan view of FIG. 9 showing shield lines, and the reference mesh plane with alternating spaces.

Referring now to FIG. 10, there is shown a schematic of the top plan (bird eye) view of the ceramic structure of FIG. 9. Top plan view 1000 includes mesh lines 1050-1058, and 1006-1014 interconnected by metal crosses 1018-1032. A via (shown as a cross-hatched area) is coupled to each one of metal crosses 1018-1032. The spaces 1034, 1036, 1038, and 1040 alternate in a desired direction. The shield lines 1042, 1044, 1046, and 1048 are arranged in pairs on opposite sides of each signal lines. The shield lines run parallel to the signal lines, and are of equal length as the signal lines. In addition, selected ones of the shield lines are interconnected to one or more of the vias located along the directional path in which the particular shield line extends.

Figure 11:
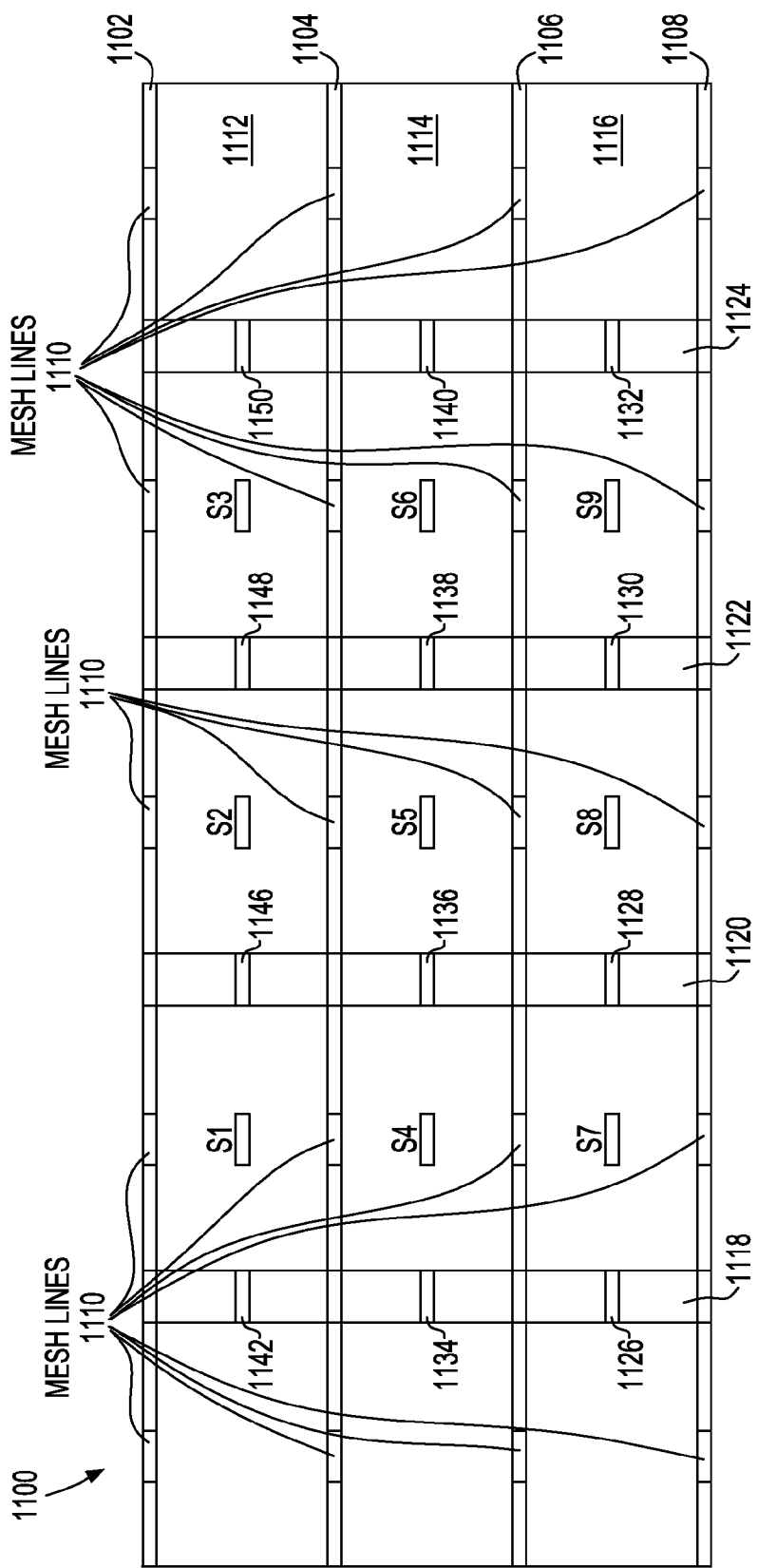
FIG. 11 is a schematic cross-section of the multi-layered ceramic package depicted in FIG. 9.

Referring now to FIG. 11, there is shown a schematic of a cross-sectional view of FIG. 9. The cross-sectional view 1100 includes mesh planes 1102-1108. A plurality of mesh lines 1110 are operatively distributed on the mesh planes. Signal planes 1112-1116 are positioned between the mesh planes. Signal lines S7, S8, and S9 are in signal plane 1116; signal lines S4, S5, and S6 are in signal plane 1114; and signal lines S1, S2, and S3 are in signal plane 1112. Vias 1118, 1120,

1122, and 1124 extend from mesh plane 1108, through mesh planes 1106, 1104, and terminating at mesh plane 1102. Shield lines 1126, 1128, 1130, and 1132 are in signal plane 1116. In addition, signal lines S7, S8, and S9 are also in signal plane 1116. Likewise, shield lines 1134, 1136, 1138, 1140, signal lines S4, S5, and S6 are in signal plane 1114. Finally, shield lines 1142, 1146, 1148, and 1150 are in signal plane 1112. In addition, signal lines S1, S2, and S3 are, also, in signal layer 1112. The shield lines are selectively connected to selected ones of the vias. Having described novel structures for multi-layered ceramic packages that significantly reduce Far-End (FE) noise, a comparison between performance of the improved structures and performance of a conventional structure will now be described.

A multi-layered ceramic package design with alternating spaces as described in FIG. 5, was energized or activated in accordance with the procedure set forth herein. Likewise, a conventional multi-layered ceramic package design with constant spaces as described in FIG. 1 was also energized or activated in accordance with the procedure set forth herein. Table 1 below sets forth the result that clearly demonstrates the superiority of the novel structure to reduce or suppress FE noise.

TABLE 1

| Structures\Noise | Maximum Far-End (FE) noise on a victim line (S5) |
| --- | --- |
| Structure with mesh planes with constant spaces | −51.5 [mv] |
| Structure with mesh planes with alternating spaces | −35.1 [mv] |

As shown, Table 1 comprises two columns. Column 1 lists the structure that is being exercised; and column 2 lists maximum FE noise associated with each structure. Table 1 provides coupling noise for two distinct configurations shown via the rows of the table. The first configuration row provides result for a configuration, which uses constant spaces in the mesh plane; whereas the second configuration row uses mesh planes with alternating spaces. The configurations are computer generated and then exercise on a PowerSPICE simulator to provide a noise coupling comparison. PowerSPICE is International Business Machines SPICE simulator. The commercially available products may include PSPICE market by Cadence Design Systems; and HSPICE market by Synopsys. A one volt (1 V) ramp source with 75 pico-second (psec) rise time is applied to input of signal lines S1, S2, S3, S4, S6, S7, S8 and S9. The length of the signal lines was chosen to be 2 cm in this simulation. The signal net S5 (see FIG. 5 and FIG. 1) was selected as the victim net in the simulation. The inputs and outputs of the signal lines were terminated in 50 ohms resistors.

Table 1 demonstrates far-end (FE) coupling effects on S5 victim signal net due to all eight aggressor nets for the configuration using mesh planes with constant spaces, and mesh planes with alternating spaces. Table 1 shows that the maximum FE noise is reduced greatly (31.8%) by the structure using mesh planes with alternating spaces.

A mathematical explanation as to why the structure using alternate spaces is superior in controlling FE noise than structures with equal or constant spaces follows: The maximum (or saturated) far-end (FE) noise, $V_F$, can be expressed as follows when signal lines are terminated with 50Ω resistor at input and output and aggressors are with pulse excitation;

$$V_F = \frac{1}{2}\left(\frac{C_m}{C} - \frac{L_m}{L}\right)\frac{l\sqrt{LC}}{t_r}V_S \qquad (1)$$

where $C_m$ and $C$ are the mutual capacitance per unit length and the self capacitance per unit length, respectively, and $L_m$ and $L$ are the mutual inductance per unit length and the self inductance per unit length, respectively. $V_s$ is the voltage amplitude on the active line, l is the coupling length, and $t_r$ is the input pulse rise time. It is clear that the maximum (or saturated) FE noise can be negative or positive depending on magnitude of $C_m$, $C$, $L_m$ and $L$. In other words, far-end (FE) noise coupling can be eliminated when the following condition is met:

$$\frac{C_m}{C} - \frac{L_m}{L} = 0 \qquad (2)$$

or $$\frac{C_m}{C} = \frac{L_m}{L}$$

It should be noted that the condition in the above equation (2) implies that it is possible to eliminate far-end (FE) noise completely if the interconnect structure can be designed to satisfy a balanced condition in the equation (2).

However, the $$\frac{C_m}{C} - \frac{L_m}{L}$$

is normally not zero. That is, $$\frac{C_m}{C} - \frac{L_m}{L} \neq 0$$

in most practical cases.

The reason why we observed less maximum far-end (FE) noise in the mesh plane structure with alternating spacing than in conventional mesh plane structure with constant spacing is that the mesh structure with alternating spacing can produce a smaller number in $$\frac{C_m}{C} - \frac{L_m}{L}$$

than the conventional mesh structure with constant spaces.

It is possible to reduce far-end (FE) noise further by employing shield lines in mesh plane structure with alternating spaces (see FIG. 9).

Table II comprises two columns. The first column lists the structures that are being exercised. The second column lists the results of FE noise coupling on a victim line (S5), inflicted by all eight aggressor lines S1-S4 and S6-S9. The first configuration row provides results for a structure using mesh planes with constant spacing. The second configuration row uses mesh planes with alternate spacing. Both structures were exercised as follows: A one volt (1 V) ramp source with 75 pico-second (psec) rise time is applied to input of signal lines S1, S2, S3, S4, S6, S7, S8 and S9. The lengths of the signal lines were chosen to be 2 cm in this simulation. The signal net S5 (see FIG. 5 and FIG. 1) was selected as the victim net in the simulation. The inputs and outputs of the signal lines were terminated in 50 ohms resistors. Table 11 summarizes these results. It is observed that the maximum FE noise voltage is reduced greatly by mesh planes with alternating spaces and shield lines (75.3% reduction in this case).

TABLE II

| Structures\Noise | Maximum Far-End (FE) noise on a victim line (S5) |
|---|---|
| Structure with mesh planes with constant spaces | −51.5 [mv] |
| Structure with mesh planes with alternating spaces and shield lines | −12.7 [mv] |

Figure 12:
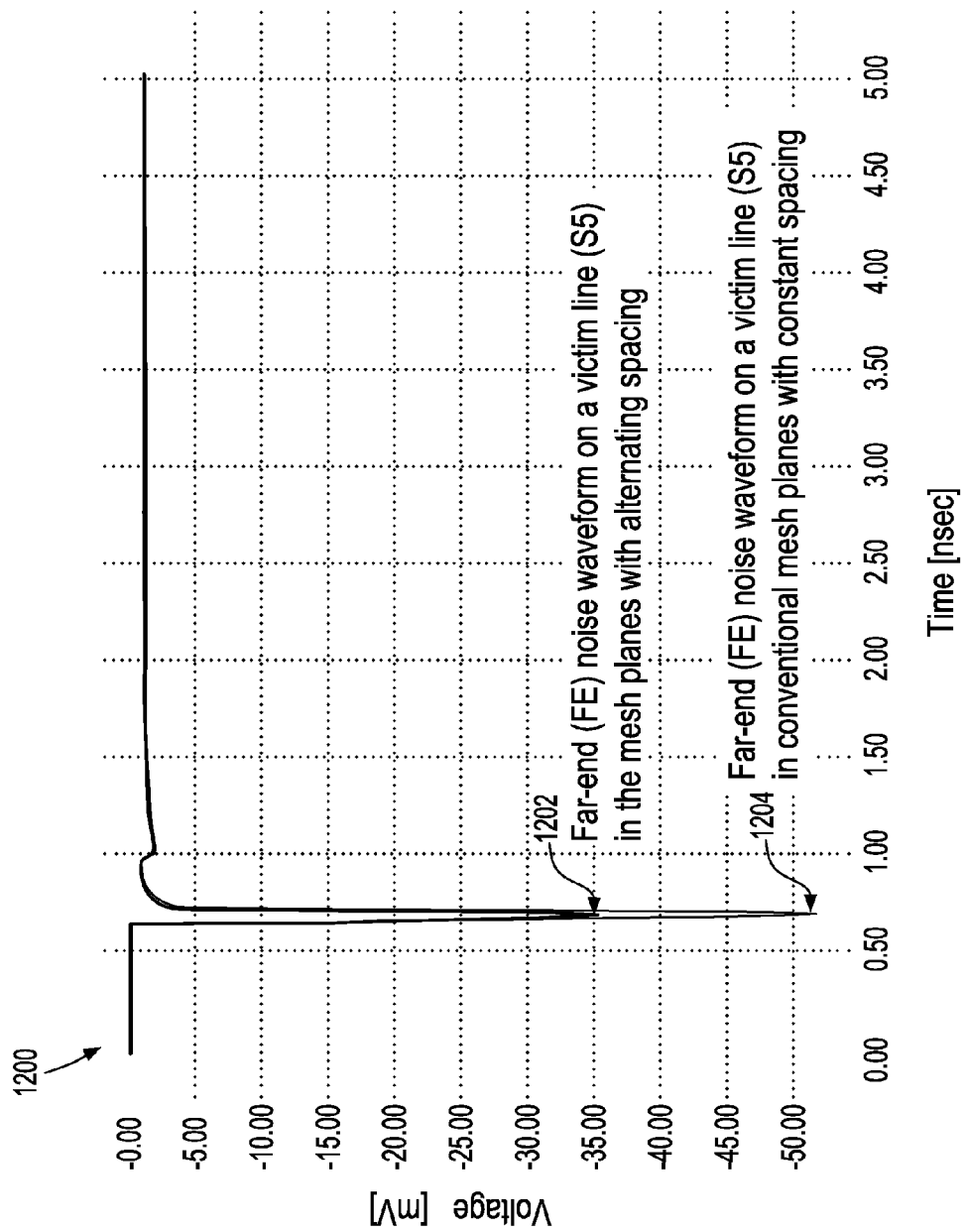
FIG. 12 is a graph illustrating FE (Far End) noise in a multi-layered ceramic package having constant spaces in the reference mesh plane, and the multi-layered package having alternating spaces in the reference mesh plane.

FIG. 12 is a graph illustrating the comparison of Far-End (FE) noise waveforms on the victim signal net (such as S5 of FIG. 5 and FIG. 1) due to all eight aggressor nets for a multi-layered ceramic structure having mesh planes with alternating spaces (FIG. 5) according to an embodiment of the invention; and a multi-layered ceramic structure having mesh planes with constant spaces (FIG. 1). Graph 1200 depicts FE noise waveform 1202 resulting from a trace configuration having mesh planes with alternating spaces. Graph 1200 also depicts FE noise waveform 1204 resulting from a trace configuration having mesh planes with constant spaces. A comparison between graph 1202 and graph 1204 demonstrates that the maximum FE noise voltage is reduced greatly by the mesh plane structure with alternating spaces (31.8% reduction in the case of graph 1200).

Figure 13:
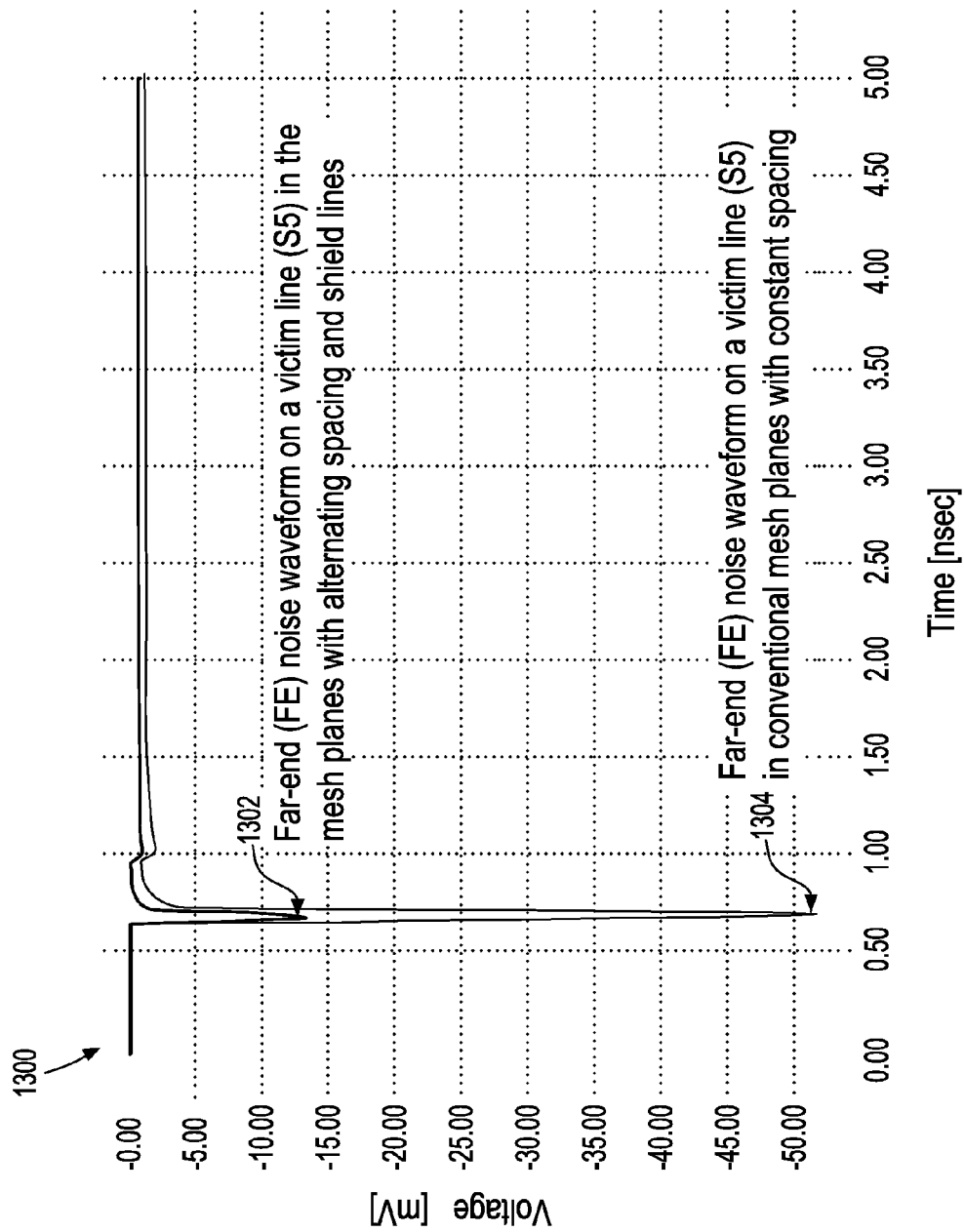
FIG. 13 is a graph illustrating FE noise in a multi-layered ceramic package having a reference mesh plane with constant spacing, a multi-layered ceramic package having shield lines in the signal plane, and alternate spaces in the reference mesh plane.

FIG. 13 is a graph illustrating the comparison of Far-End (FE) noise waveform on the victim signal net (such as S5 of FIG. 1 and FIG. 9) due to all eight aggressor nets for a multi-layered ceramic structure having mesh planes with alternating spaces and shield lines (FIG. 9) according to an embodiment of the invention; and a multi-layered ceramic structure having mesh planes with constant spaces (FIG. 1). Graph 1300 depicts FE noise waveform 1302 resulting from a trace configuration having mesh planes with alternating spaces, and shield lines in the signal planes. Graph 1300 also depicts FE noise waveform 1304 resulting from a trace configuration having mesh planes with constant spaces. A comparison between graph 1302 and graph 1304 demonstrates that the maximum FE noise voltage is reduced greatly by the mesh plane structure with alternating spaces and shield lines (75.3% reduction in the case of graph 1300).

Figure 14:
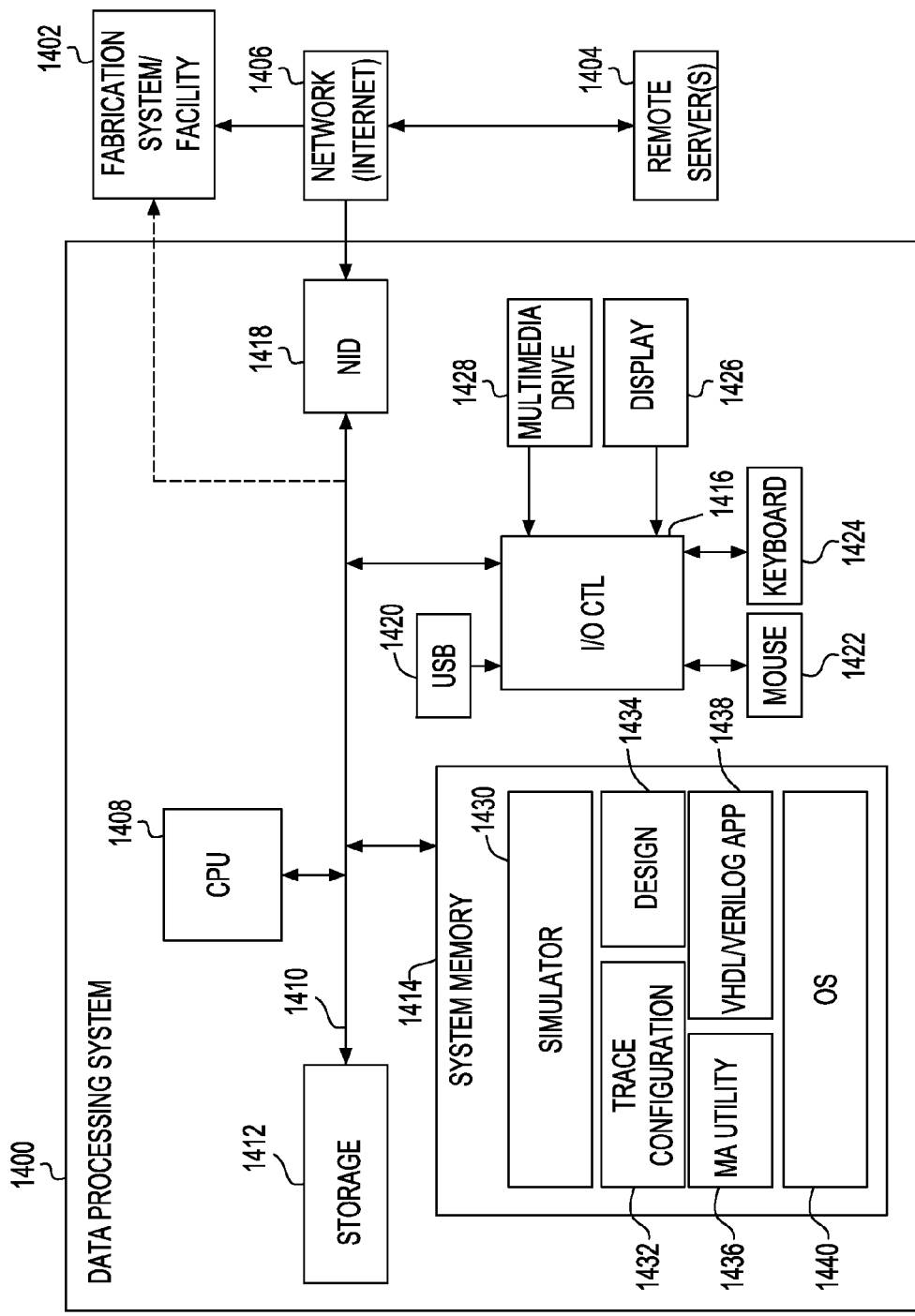
FIG. 14 is an exemplary data processing system, and fabrication facility in which an embodiment of the multi-layered ceramic package may be designed and fabricated.

FIG. 14 is a block diagram of an exemplary Data Processing System (DPS) 1400 that is coupled to fabrication system facility 1402 and remote servers 1404 by communications network, such as the internet, 1406. The DPS 1400 generates the design for the multi-layered ceramic package according to an embodiment of the invention. The design is delivered to fabrication system facility 1402, which fabricates the multi-layered ceramic package according to the delivered design. The design may be delivered to fabrication facility 1402 over the internet or some other type of communication network or recorded on a computer readable media, and delivered by one of the well known delivery services. Remote server or servers 1404 may provide design data or other information to DPS 1400. The broken line between DSP 1400 and the fabrication system facility 1402 represents the alternate way, other than the internet, by which the design could be delivered to the fabrication facility 1402.

Still referring to FIG. 14, DPS 1400 includes CPU 1408 that is coupled by system bus 1410 to storage 1412, system memory 1414, input/output controller (I/O CTL) 1416, and network interface device (NID) 1418. NID 1418 provides network connectivity between communications network 1406, devices that are coupled to it, and DPS 1400. I/O controller 1416 provides connectivity to CPU 1408 for I/O devices, which may include USB 1420, mouse 1422, keyboard 1424, display 1426, and multi-media drive 1428 (e.g. compact disk read/write (CDRW) or digital video disk (DVD) drive. The I/O devices allow a user to communicate with DSP 1400 by entering and/or extracting information there from. For example, multi-media drive 1428 and USB port 1420 enable insertion of a removable storage device (e.g. optical disk or "thumb" drive) on which data/instruction/code may be stored and/or from which data/instruction/code may be retrieved. The devices are used in the normal conventional way and will not be discussed further. Various multi-layered ceramic package designs features are completed/supported by way of software (or firm ware) code or logic stored within storage 1412 and executed by CPU 1408. Thus, for example, illustrated in system memory 1414 are several software/firmware/logic modules or components including simulator 1430, trace configuration 1432, design 1434, mesh adjustment (MA) utility 1436, Very High Speed Integrated Circuit Hardware Description Language (VHDL)/Verilog 1438, and operating system (OS) 1440. The MA utility 1436 includes program code that generates a multi-layered ceramic package according to an embodiment of the invention. Notably, the spaces in the reference mesh plane of this structure alternates as set forth above. The program code/logic etc. is based on the embodiment and/or flow chart set forth herein. Trace configuration 1432 includes program code that generates a conventional multi-layered ceramic package when executed by the CPU 1408. Notably, the spaces in the structure are constant, as set forth herein. The design module 1434 contains the code resulting from the CPU execution of code from MA Utility 1436 and/or code from trace configuration 1432. It should be noted the code from design module 1434 is forwarded to fabrication system facility 1402 and is used to generate the final multi-layered package. The simulator 1430 provides simulation function; whereas OS 1440 provides support for the application modules riding on it.

Referring now to FIG. 15, there is shown an exemplary block diagram of an alternate system 1500 for designing and fabricating a multi-layered ceramic package according to an embodiment of the present invention. The system 1500 includes ceramic package design system 1502, design analysis system 1504, mesh adjustment engine 1506, and ceramic package fabrication system 1508. The named systems and engines are coupled as demonstrated in the figure. The ceramic package design system 1502 provides a multi-layered ceramic package design identifying signal planes with operatively placed signal lines thereon; voltage and reference mesh planes with constant mesh lines thereon, voltage and ground vias, and other elements of a conventional ceramic package. The design data from design system 1502 is provided to design analysis engine 1504, which analyzes the design to determine, among other things, FE noise inflicted on a victim net, such as victim net S5 (FIG. 1), by aggressor nets, such as aggressor nets S1 S2 S3 S4 S6, S7, S8, and S9 (FIG. 1). A commercially available 3D solver, like HFSS (market by ANSYS), can be used to generate a 3D image of the design, which is executed on another commercially available machine, such as SPICE, to provide noise level in milivolt (Mv). The other information such as constant spacing (pitch, etc.) between mesh lines is determined and forwarded to the mesh adjustment engine 1506, which redesign the mesh plane to incorporate alternating spaces as set forth herein. The new design, including mesh planes with alternating spaces, is forwarded to the design analysis engine, which may perform a noise test. If the result of the noise test is satisfactory, the new design of the multi-layered ceramic package, with alternating space mesh plane, is forwarded to the ceramic package fabrication system 1508 for fabrication. In an alternate design, if the noise level in the structure with variable alternate spaces mesh plane is not satisfactory, the structure may be returned to the mesh adjustment engine 1506, which inserts shield lines in the signal plane, as set forth herein, to further reduce noise.

FIG. 16 is a flow chart of a method to design and fabricate an improved multi-layered ceramic package according to an embodiment of the invention. The method begins in block 1602 and terminates in block 1614. In step 1604, a multi-layered ceramic package design is received. The package may be a conventional one identifying known components, previously described (see FIG. 1), including mesh planes with constant spaces. Step 1606 analyses the design to determine (among other things) the noise level in the package, using procedures set forth herein, the constant pitch of mesh lines in the mesh plane etc. In step 1608, the noise level which may be provided in mili volt (mV) is compared with a desired reference noise level, which may be set by a designer to meet required system characteristics. If the noise level is satisfactory (e.g. below a set threshold), the process exits along the NO-path to step 1612, which fabricates the ceramic package according to the received design.

Still referring to FIG. 16, if in step 1608 the noise level is unacceptable (i.e. higher than the threshold), the process exits along the "Yes" path into step 1610, which adjusts the design by inserting reference mesh planes with alternating spaces. The design of the mesh plane may be effectuated by setting the pitches in a desired ratio such as, for example, 2:1 or 2.5:1 or 3:1 or some other ratio. The new ceramic design with variable alternating spaces is returned to step 1606 to determine the noise level. The noise level is compared, as before, in step 1608. If it passes (i.e. below threshold) the design is passed to step 1612 for fabrication; and the process ends in step 1614. If, however, the noise level of the structure with alternating spaces was still above the threshold for noise set in step 1608, the design could be returned to step 1610, which could add shield lines (see FIG. 9). The combination of shield lines and alternate spaces in the multi-layered ceramic package would greatly reduce the far end (FE) noise. The new design would proceed along the path previously described, and exit the process in step 1614.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium having computer-usable program code stored in the medium.

Any combination of one or more computer usable or computer readable storage medium(s) may be utilized. The computer usable or computer readable storage medium may be, for example but not limited to, an electronic, magnetic, optical, electromagnetic, infrared, or semiconductor system, apparatus, or device. More specific examples (a non-exhaustive list) of computer usable mediums would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, or a magnetic storage device. Note that the computer usable storage medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer usable medium may be any medium that can contain or store the program for use by or in connection with the instruction execution system, apparatus, or device.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The computer program code may execute entirely on a user's computer as a stand-alone software package or as an integrated component of a larger software package, partly on the user's computer and partly on a remote computer or entirely on remote computer or server. In the latter scenario, the remote computer may be connected to the user's computer through any type of network, including a local area network (LAN) or a wide area network (WAN), or the connection may be made to an external computer (for example, through the Internet using an Internet Service Provider). The following description will indicate where specific program code is or can be executed in a network of computer devices.

The present invention is described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operations to be performed on the computer or other programmable apparatus to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method comprising:
providing a first multi-layered ceramic package design, said first multi-layered ceramic package design including at least one signal plane having a plurality of signal lines thereon and at least a first reference mesh plane operatively placed relative to the signal plane and having a plurality of mesh lines and mesh spaces wherein said mesh spaces are equal;
providing a mesh adjustment engine to access the first multi-layered ceramic package design and re-arrange the plurality of mesh lines in said first reference mesh plane to provide a second mesh plane design including mesh lines and mesh spaces wherein said mesh spaces between the mesh lines alternate in a predefined pattern; and
integrating the second mesh plane design with other components of the first multi-layered ceramic design to provide a second multi-layered ceramic package design.

2. The method of Claim of claim 1 further including fabricating a multi-layered ceramic package based on the second multi-layered ceramic package design.

3. The method of claim 1 wherein spaces, between mesh lines of said second mesh plane, alternate in an N and 2N pattern, wherein N represents a desired unit of measurement.

4. The method of claim 1 further including placing vias at predefined sites on said second multi-layered ceramic package design.

5. The method of claim 1 further including placing shield lines on opposite sides of each signal lines in said signal plane of said second multi-layered ceramic package design.

6. The method of claim 4 wherein the second multi-layered ceramic package design is being implemented on a computer system.

7. The method of claim 5 wherein the second multi-layered ceramic package design is implemented on a computer system.

8. The method of claim 7 wherein the computer system includes a multi-layered ceramic package design system configured to provide the first multi-layered ceramic package design; and a mesh adjustment system configured to provide the mash plane with alternating spaces.

9. The method of claim 6 wherein the computer system includes a multi-layered ceramic package design system configured to provide the first multi-layered ceramic package design; and a mesh adjustment system configured to provide the mesh plane with alternating spaces.

10. A computer system comprising:
a multi-layered ceramic package design sub-system configured to provide a multi-layered ceramic package design, said ceramic package design including a plurality of signal planes with each signal plane having a plurality of signal lines thereon ; and
a mesh adjustment engine configured to access the multi-layered ceramic package design and provide at least one reference mesh plane in which mesh lines are placed so that spaces in said mesh planes are arranged in an alternate pattern.

11. The computer system of claim 10 wherein the multi-layered ceramic package design further includes a mesh plane with equal spaces in said mesh plane wherein said mesh planes with equal spaces is being replaced with the at least one reference mesh plane with alternate spaces.

12. The computer system of claim 10 wherein the adjustment engine sets a N and 2N ratio for the alternate pattern of the spaces and wherein N represents a unit of measurement.

13. The computer system of claim 10 further including a sub system for placing vias in selected location within said multi-layered ceramic package design.

14. The computer system of claim 10 further including a sub system for placing shield lines on opposite sides of signal lines within the signal plane.

15. A non-transitory computer readable medium embedded with computer program codes, said computer program codes comprising:
computer program code for receiving a multi-layered ceramic package design, said ceramic package design including at least one signal plane having a plurality of signal lines thereon and at least one reference mesh plane positioned relative to the signal plane and having a plurality of mesh lines equally spaced relative to one another;
computer program code for analyzing the multi-layered ceramic packet design to determine noise level associated therewith; and
computer program code for modifying the mesh lines if the noise level exceeds a predefined level.

16. The non-transitory computer readable medium of claim 15 wherein the mesh lines are modified so that spaces between the mesh lines are in an N and 2N pattern, wherein N represents a unit of measurement.

17. The non-transitory computer readable medium of claim 15 wherein the computer program code that analysis the multi-layered ceramic package design further includes computer program code for generating a three dimensional (3D) image design of said multi-layered ceramic package design, and program code for simulating the 3D image design and generating a voltage representing the noise level in said package.

18. The non-transitory computer readable medium of claim 15 wherein the mesh lines are not modified if the noise level falls below the predefined level.

* * * * *